M. SCHENKEL.
CONNECTIONS FOR REGULATING THE SPEED OF ALTERNATING CURRENT COMMUTATOR MOTORS.
APPLICATION FILED SEPT. 6, 1911.
1,033,474.
Patented July 23, 1912.
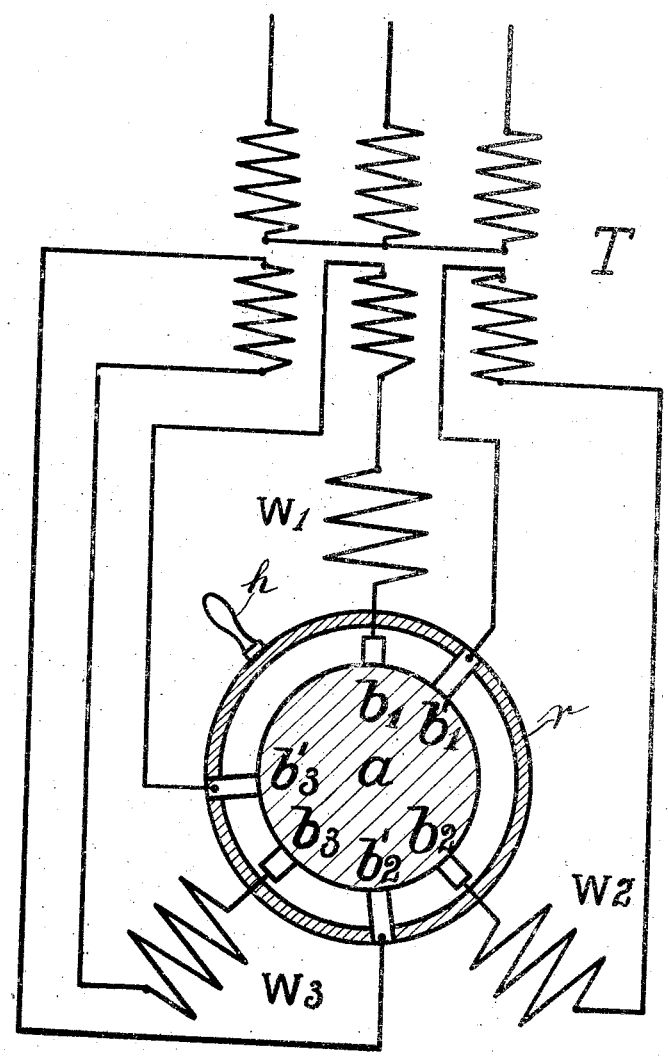

UNITED STATES PATENT OFFICE.

MORITZ SCHENKEL, OF CHARLOTTENBURG, GERMANY, ASSIGNOR TO SIEMENS-SCHUCKERT WERKE, G. M. B. H., OF BERLIN, GERMANY, A CORPORATION OF GERMANY.

CONNECTIONS FOR REGULATING THE SPEED OF ALTERNATING-CURRENT COMMUTATOR-MOTORS.

1,033,474.   Specification of Letters Patent.   Patented July 23, 1912.

Application filed September 6, 1911. Serial No. 647,949.

*To all whom it may concern:*

Be it known that I, MORITZ SCHENKEL, a subject of the German Emperor, and residing at Charlottenburg, near Berlin, Germany, have invented certain new and useful Improvements in Connections for Regulating the Speed of Alternating-Current Commutator-Motors, of which the following is a specification.

My invention relates to connections for regulating the speed of alternating-current commutator motors.

The principal object of my invention is to avoid the use of auxiliary apparatus, such as choking coils or intermediate transformers, in connection with polyphase alternating-current commutator motors having two sets of brushes which are displaced relatively to each other, or in which one of the sets of brushes is shifted while the other is stationary, for the purpose of regulating the speed of the motor.

It is well known to regulate the speed of alternating current commutator motors within certain limits by shifting the brushes or by varying the voltage. Further, arrangements are known in which these two modes of regulation are combined by shifting the brushes of one of two sets of brushes or by holding one set of brushes stationary while the other is shifted. A change of the field and simultaneously a change of the voltage per turn of the rotor winding is thus brought about. By means of this expedient it is possible to regulate the speed of the motor continuously down to zero.

An embodiment of my invention is represented diagrammatically in the accompanying drawing.

According to my invention I avoid auxiliary devices such as choking coils or intermediate transformers by connecting each section of the rotor winding, bounded by a pair of brushes, in series with a section of the stator winding and by independently feeding each of these sets connected in series. In the drawing, $w_1$, $w_2$, $w_3$ designate the stator windings of a three-phase series motor; $b_1$, $b'_1$; $b_2$, $b'_2$ and $b_3$, $b'_3$ each designate two appertaining brushes of the two sets of brushes and T designates the secondary winding of a polyphase transformer. According to my new connection each section of the rotor is connected together with one stator phase in series with one limb of the transformer T.

As will be readily understood, certain conductors of the rotor remain currentless so long as the brush $b_1$ does not coincide with the brush $b'_1$, the brush $b_2$ with the brush $b'_2$, and the brush $b_3$ with the brush $b'_3$, so that here again, as in the known arrangements, the number of operative turns of the rotor winding and with it the voltage per turn depends on the displacement of the brushes. Thus if it should be desired to regulate the speed of the motor it is only necessary to shift, by means of handle $h$, ring $r$ which carries one set of the brushes in one or the other direction, by which these brushes are displaced relatively to the other set so that the number of operative turns of the rotor winding is varied.

I claim:—

1. In a polyphase alternating current motor, the combination with the rotor having a commutator, and a plurality of sets of brushes for said commutator movably disposed relatively to each other for varying the speed of the motor, each section of the rotor winding bounded by two appertaining brushes of the two sets being connected through said brushes in series with a corresponding section of the stator winding, and a plurality of means corresponding in number with the stator sections, each means being arranged in series with the corresponding stator and rotor section for supplying current to said two sections.

2. In a polyphase alternating current motor, the combination with the rotor having a commutator, and a plurality of sets of brushes for said commutator movably disposed relatively to each other for varying the speed of the motor, each section of the rotor winding bounded by two appertaining brushes of the two sets being connected through said brushes in series with a corresponding section of the stator winding, and a transformer, having a plurality of secondary coils corresponding in number with the stator sections, each of said secondary coils being arranged in series with one of the stator and rotor sections for supplying current to said two sections.

In testimony whereof I have signed my name to this specification in the presence of two witnesses.

MORITZ SCHENKEL.

Witnesses:
HENRY HASPER,
ARTHUR SCHROEDER.

Copies of this patent may be obtained for five cents each, by addressing the "Commissioner of Patents, Washington, D. C."